J. Shidler,
Batten Roofing,
Nº 40,191.  Patented Oct. 6, 1863.
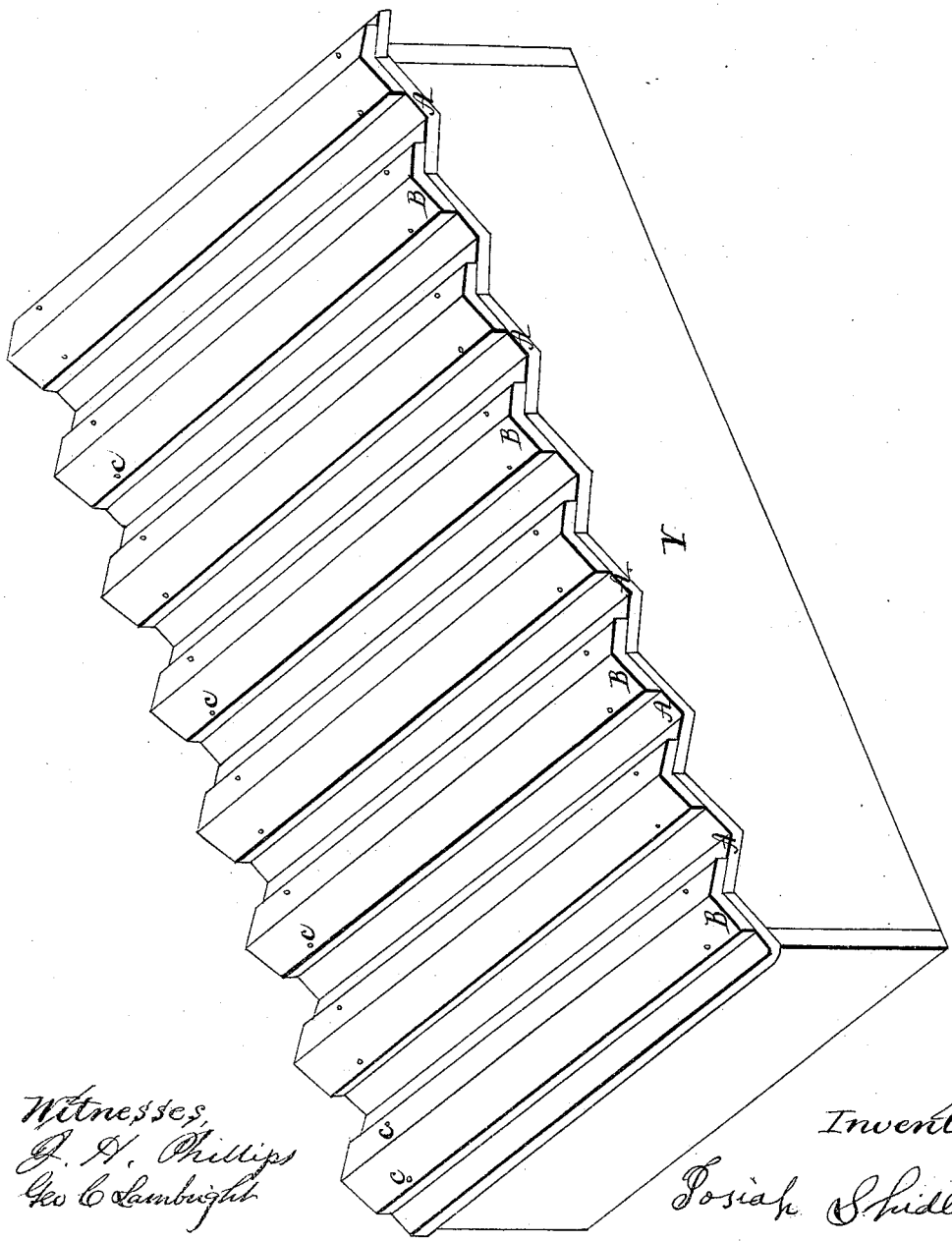
Witnesses,
J. A. Phillips
Geo C Lambright
Inventor,
Josiah Shidler

UNITED STATES PATENT OFFICE.

JOSIAH SHIDLER, OF KNOX TOWNSHIP, OHIO.

IMPROVEMENT IN ROOFS OF BUILDINGS.

Specification forming part of Letters Patent No. 40,191, dated October 6, 1863.

*To all whom it may concern:*

Be it known that I, JOSIAH SHIDLER, of Sandy, in the county of Columbiana and State of Ohio, have invented a certain new and useful Improvement in Roofing; and I do hereby declare the following to be a full and exact description of the same, reference being had to the accompanying drawing, making a part of this specification, in which is represented a perspective view of a portion of a roof illustrating my invention.

The subject of the said invention is a roof composed of a series of jointless V-shaped troughs, placed side by side, with the joints between them covered with inverted troughs of similar form, but of less width, as will be hereinafter more fully explained.

In order that others skilled in the art to which my invention appertains may be enabled to fully understand and use the same, I will proceed to describe its construction and operation.

In the accompanying drawings, A A represent V-shaped troughs, each of which is sawed out in one entire piece, the sides meeting at the bottom in a right or obtuse angle without any joint.

B B represent narrower troughs of similar form, which are placed in inverted positions over the joints between the troughs A.

*y* represents a plate or supporting-beam, of which any desired number may be used, placed at required distances beneath the troughs A A to support the roof. The said plates *y* are notched to suit the angle shape or inclination which it may be desired to give the troughs A A.

C C represent nails by which the troughs B and A are secured to the plates *y*.

For constructing this roof the pieces A and B are first sawed out with any desired angle by means of two converging saws or otherwise, the wide pieces A being taken out wherever the logs admit of it, and the narrower troughs in other cases. The material may thus be worked up with little or no more waste than occurs in sawing flat boards. Any required number of the plates *y*, being placed in position at suitable distances, and notched to correspond with the desired slope and angle of the troughs A A, the latter are placed on the plates at any inclination with their edges close together. The narrow troughs B B are then placed in inverted positions over the joints, between the troughs A A, and the whole secured with nails C C.

The above-described roof is cheap, durable, and perfectly secure against leakage. Rain falling upon any part of the roof runs immediately to the bottom of the troughs A A, and runs down them without contact with the upper inverted troughs B, or with any joint in which the water can enter or be harbored. The portion of the roof over which the water thus flows is freely exposed to sun and wind, so that it dries immediately that the rain ceases, and is thus effectually preserved from decay.

I am aware that trough-roofs have previously been made with two series of troughs placed in reversed positions, and therefore do not desire to be understood as claiming this invention, broadly; but,

Having thus described my invention, what I claim as new, and desire to secure by Letters Patent, is—

A roof composed of a series of jointless straight-sided V shaped troughs, A A, placed side by side, in combination with the notched plates *y*, and a second series of narrower jointless straight-sided V-shaped troughs, B, placed in inverted positions over the edges of the troughs A A, all as herein described, and for the purposes specified.

JOSIAH SHIDLER.

Witnesses:
P. W. TAYLOR,
JAMES PELMER.